(12) United States Patent
Mishra et al.

(10) Patent No.: US 8,161,173 B1
(45) Date of Patent: Apr. 17, 2012

(54) ROLE PASSING AND PERSISTENCE MECHANISM FOR A CONTAINER

(75) Inventors: Anshuman Mishra, Westminster, CO (US); Subramanya Kumar, Louisville, CO (US); Brandon E. Taylor, Longmont, CO (US)

(73) Assignee: Oracle America, Inc., Redwood City, CA (US)

( * ) Notice: Subject to any disclaimer, the term of this patent is extended or adjusted under 35 U.S.C. 154(b) by 1144 days.

(21) Appl. No.: 11/095,806

(22) Filed: Mar. 30, 2005

(51) Int. Cl.
*G06F 15/16* (2006.01)
*G06F 15/173* (2006.01)

(52) U.S. Cl. ......... 709/229; 709/219; 709/225; 709/227
(58) Field of Classification Search .................. None
See application file for complete search history.

(56) References Cited

U.S. PATENT DOCUMENTS

| | | | | |
|---|---|---|---|---|
| 6,014,666 | A * | 1/2000 | Helland et al. | 707/9 |
| 6,182,142 | B1 * | 1/2001 | Win et al. | 709/229 |
| 6,205,480 | B1 * | 3/2001 | Broadhurst et al. | 709/225 |
| 6,308,212 | B1 * | 10/2001 | Besaw et al. | 709/228 |
| 6,708,207 | B1 * | 3/2004 | Sabelhaus et al. | 709/223 |
| 6,768,988 | B2 * | 7/2004 | Boreham et al. | 707/3 |
| 6,839,761 | B2 * | 1/2005 | Kadyk et al. | 709/229 |
| 6,938,085 | B1 * | 8/2005 | Belkin et al. | 709/227 |
| 6,985,955 | B2 * | 1/2006 | Gullotta et al. | 709/229 |
| 7,171,478 | B2 * | 1/2007 | Lueckhoff et al. | 709/227 |
| 7,539,856 | B2 * | 5/2009 | Buch et al. | 713/151 |
| 2008/0086564 | A1 * | 4/2008 | Putman et al. | 709/227 |

OTHER PUBLICATIONS

U.S. Appl. No. 11/095,431, filed Mar. 30, 2005.
Dong, J, et al., "Event-based blackboard architecture for muti-agent systems", IEEE, Information Technology: Coding and Computing, 2005, ITCC 2005, vol. 2, Apr. 2005, 6 pages.
Yasuda, M, et al., "A purpose-oriented access control model for object-based systems", Object-Oriented Real-Time Distributed Computing, 1998, ISORC 1998 Proceedings, Apr. 1998, 2 pages.
Ishikawa, H, et al., "An Object-Oriented database system Jasmine: Implementation, Application, and Extension", Knowledge and Data Engineering, IEEE, vol. 8, Issue 2, Apr. 1996, 20 pages.
Solaris Containers, Wikipedia, printed 2008, 9 pages.

* cited by examiner

*Primary Examiner* — Krista Zele
*Assistant Examiner* — Matthew Lindsey
(74) *Attorney, Agent, or Firm* — Osha • Liang LLP

(57) ABSTRACT

A role passing and persistence mechanism that implements role-based access control at a container level is disclosed. In one implementation, the role passing and persistence mechanism provides one or more RBAC services. Functions provided by the role passing and persistence mechanism include role validating, role persisting and role administration. The role passing and persistence mechanism is used to persist role information for a session between a client and a container for any type of client. No matter which adaptor a client uses to connect to the container, the role passing and persistence mechanism provides a uniform method of passing role information to the container such that persisted role information can be used by any service hosted by the container after the session is established and the role information has been persisted.

14 Claims, 5 Drawing Sheets

ROLE PASSING AND PERSISTENCE MECHANISM FOR A CONTAINER

BACKGROUND

A large scale computer program provides a large number of functionalities that can be invoked by users and other entities (e.g. other programs). Some of these functionalities may have significant impact on the overall operation and performance of the program, while other functionalities may have little or no impact. Because some of the functionalities may give rise to serious consequences, it is desirable to limit access to those and perhaps other functionalities to ensure that only the proper users have access to them.

Many computer programs use a role-based model for controlling access to particular functionalities or components. Role-based access control (RBAC) models determine whether a user is allowed access to a particular component or functionality based on a "role" associated with a user. Typically a user's role includes one or more privileges, and access is determined based on whether the privileges are sufficient to access the desired functionality.

In a computer program that has been implemented using containers, clients provide user authentication and role information to a container in order to access services hosted by the container. User authentication information is validated, and role information is passed to the requested service hosted by the container. If the requested service determines that a role associated with the user contains sufficient privileges to access the requested service, then the client is allowed access to the service.

It is easy to pass role information to a service in a container that supports only one particular type of client. However, in a system in which a container is used to provide common functionality to many different types of user interfaces and external programs, role information cannot be passed to the hosted services in a uniform, consistent manner.

A container that provides services to multiple types of clients has many different connection adaptors, each adaptor intended for use by a different type of client to securely route client requests to services hosted by the container. Information received at the various adaptors may be formatted in a wide variety of ways, as each adaptor may support a completely different protocol. Because each adaptor supports a different protocol, the container must be implemented such that it includes programming logic that allows the container to obtain role information formatted in many different ways from the various adaptors, and to pass the role information to the requested service in a format that is useable by the service to determine whether a user has sufficient privileges to access the service. This programming logic must include code specific to each adaptor in order to support all requests.

Because a container must include programming logic to handle requests from each adaptor, adding a new adaptor to a container requires that new programming logic be added to the container to handle requests from the new adaptor, Maintaining this programming logic in the container to interface with many different adaptors is expensive, and can lead to large amounts of redundant code.

Furthermore, once a session has been initiated between a client and the container, the role of the user cannot change or be updated. In order to change a user's role, the connection to the container must be closed, and then re-opened using new role information.

As the above discussion shows, the current approaches to implementing role-based access control in containers have significant drawbacks. Consequently, an improved approach is needed.

SUMMARY

In accordance with one embodiment of the present invention, there is provided a role passing and persistence mechanism that is used to implement RBAC at a container level. In one embodiment, the role passing and persistence mechanism is implemented as one of the services hosted by the container.

In one embodiment, the role passing and persistence mechanism provides one or more RBAC services, such as role validating, role persisting and role management. These RBAC services are exposed to the other services in the container, and those other services are able to invoke the RBAC services to have the role passing and persistence mechanism determine a role associated with a client session on their behalf. In one embodiment, the role passing and persistence mechanism is used by external entities to pass role information, validate passed role information, and persist role information for each client session.

Embodiments are used to eliminate the need for a container to include customized programming logic to handle role passing and role persistence for each type of connection protocol supported by an adaptor of the container. Embodiments provide to clients a role passing and RBAC mechanism that is independent of the connection protocols supported by various adaptors. Embodiments provide a uniform role passing and persistence mechanism that can be used to provide consistent role passing and role persistence behavior across the different connection protocols supported by a container. In addition, the role information passed by the role passing and persistence mechanism can be used for auditing purposes to track who initiated sessions and accessed services. As this discussion shows, this embodiment of the present invention achieves the advantages of the prior approaches without suffering the accompanying drawbacks.

In one embodiment, the role passing and persistence mechanism operates as follows. A client connects to an adaptor of a container to initiate a session. Significantly, role information is not used in session establishment. Once the session is established, the container exposes Application Programming Interface (API) calls that implement the role passing and persistence mechanism to the client. The client's role information is passed to the role passing and persistence mechanism for validation and persisting through remote API calls. Persisted role information can be later accessed through the role passing and persistence mechanism by services that are invoked during the established session. Role information is persisted for the established session, and services obtain the persisted role information by providing a session identifier to the role passing and persistence mechanism.

Using embodiments of the present invention, role information is passed from a client to the container without going through an adaptor, but rather by using the connection established by an adaptor. Because role information is passed directly to the container, new adaptors can be added to the container without requiring new programming logic to be added to the container to obtain role information from the new adaptor.

Furthermore, role definitions can be changed at any time by invoking role management functions of the role passing and persistence mechanism. In addition, a client session/role association can also be changed at any time. These types of role management functions can be performed at any time "on-the-fly", and sessions do not have to be shut and reopened to change a role definition, or change which role is associated with a session.

DETAILED DESCRIPTION OF EMBODIMENT(S)

A role passing and persistence mechanism is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

Containers and Connection Adaptors

Figure 1A:
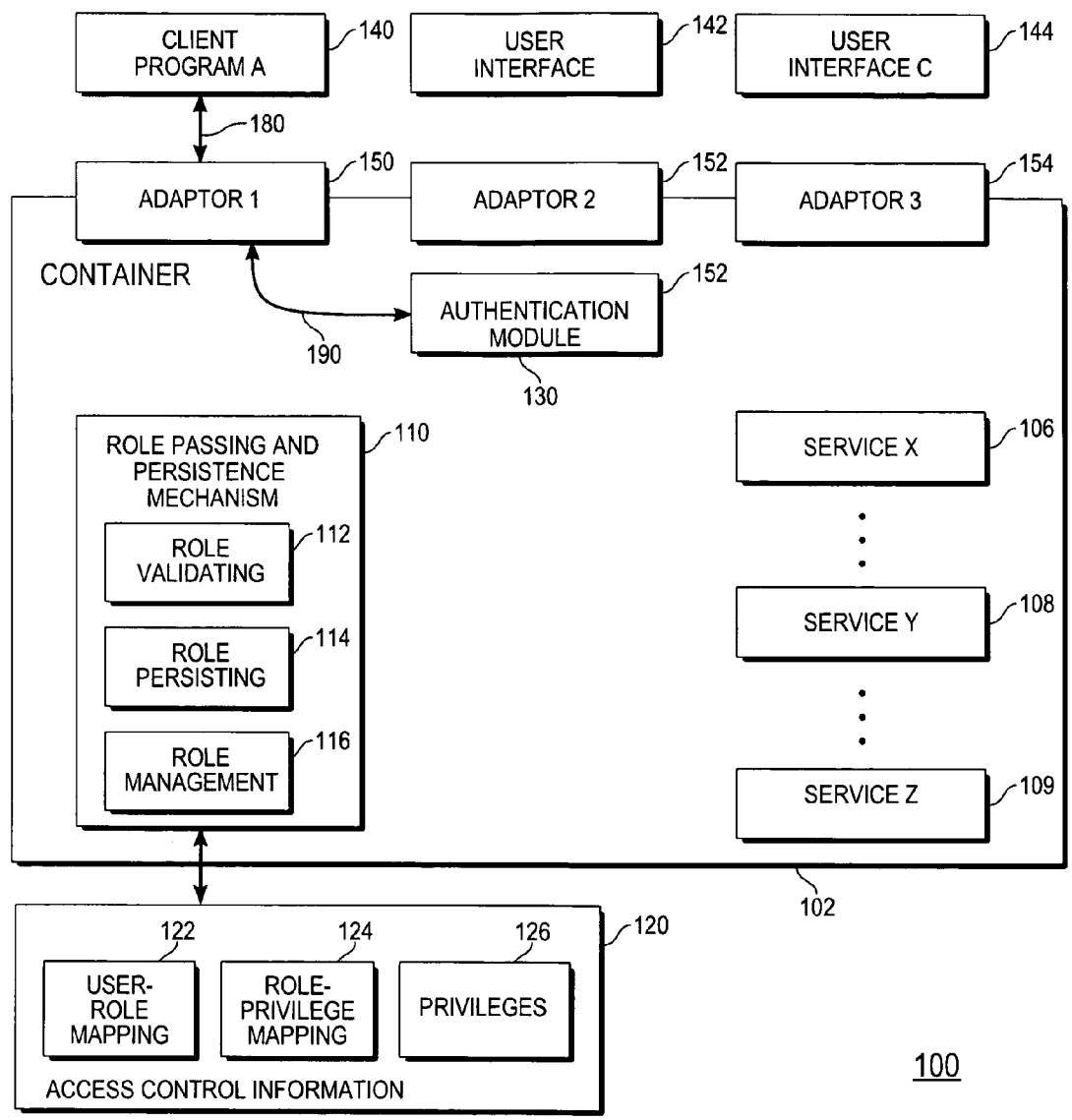
FIGS. 1A-1C are functional block diagrams of a system in which one embodiment of the present invention may be implemented.

With reference to FIG. 1A, there is shown a functional block diagram of a system in which one embodiment of the present invention may be implemented. As shown, the system 100 comprises a container 102. Typically, a container is implemented as a component specialized to host other components. As used herein, the term container refers broadly to any program that contains, hosts and/or deploys one or more services. Examples of a container 102 include, but are certainly not limited to, web servers and web application servers.

"Services" refer to the pieces of functionality hosted by the container. In one embodiment, a service hosted by a container is exposed to other services in the container 102, as well as to entities (e.g. users and programs) external to the container 102. In the example embodiment shown in FIG. 1A, container 102 hosts Service X (106), Service Y (108), and Service Z (109).

In one embodiment, container 102 is a "common container" that can be accessed by many different types of user interfaces and programs. A common container allows many different types of external entities to access common functionality. Examples of the types of external entities that may request a service provided by a common container may include, but are certainly not limited to, a Common Language Infrastructure (CLI) client application, a Browser User Interface (BUI), a Simple Network Management Protocol (SNMP) client, a Remote Method Invocation (RMI) client application, etc. Such user interfaces and programs are herein collectively referred to as "clients", and can include any entity external to the container that requests a service hosted by the container. In the example embodiment shown in FIG. 1A, clients 140, 142 and 144 make requests to container 102 for any of the services 106, 108, 109. In the example shown in FIG. 1A, client 140 is a Client Program, such as a CLI client application, while clients 142 and 144 are user interfaces, such as BUIs. Any number and type of client can connect to container 102.

In order to allow many different types of clients to access hosted services, container 102 may include one or more adaptors 150, 152, 154 through which a client may connect and request services, and through which services are delivered. The services hosted by the container are exposed through the adaptors. Each adaptor may include different connection mechanisms that are used by various clients to establish communication channels with the container and access hosted services. Typically, each adaptor supports a particular connection or network protocol, such as Java Management Extensions (JMX), SNMP, RMI or Simple Object Access Protocol (SOAP), for example. A client connects to the appropriate adaptor that supports a protocol used by the client to make requests for services from the container. In the example embodiment of FIG. 1A, Client Program A (140) may be a CLI client application that connects through connection 180 to Adaptor 1 (150) that supports the CLI protocol, for example, while Adaptor 2 (152) may support BUI clients, and Adaptor 3 (154) may support another type of client. Any number and type of adaptors may be included in a container.

When a client connects to a container through an adaptor, the adaptor uses the services of one or more authentication modules 130 to authenticate the user associated with the client. For example, a request from a client to an adaptor may include a user ID and password. The client communicates the request to an appropriate adaptor using the network protocol supported by the adaptor. The adaptor provides user identification information, such as User ID and password, to an authentication module 130 so that authentication module 130 can authenticate the user associated with the client. For example, Adaptor 1 may pass the User ID and password obtained from Client Program A in connection 180 to authentication module 130 as parameters in a call 190.

Authentication module 130 may be a service hosted by the container 102, as shown in the example embodiment of FIG. 1A. In one embodiment, container 102 contains a plurality of authentication modules, and adaptors may use different authentication modules to authenticate users. Alternatively, authentication module may be an Operating System (OS)-based service. No matter how authentication module 130 is implemented, the adaptor is just used to pass the user identification information on to the authentication module. Significantly, only user identification information is passed to the authentication module, and role-based access control information is not passed. Authentication module 130 only authenticates a user associated with a client and does not provide any role-based access authorization functions.

Authentication module 130 receives user identification information, authenticates the user associated with the client, and reports the results of the authentication to the adaptor. If the user is valid, a client session (i.e., communication channel) is created between the client and the container. The session is given a "session ID" that uniquely identifies the session at the container level.

Once a session is established, it will remain open until closed. Any requests received by the container through this session will be identified by the session ID, which also identifies the user associated with the client that established the session. That is, session management is provided at the container level, so that once a session is established between client and container, the container is responsible for determining the client associated with the session ID for each established session.

An adaptor is used only to call an authentication function and establish a session; it is not used again after a session has been established. The session is used to provide services of the container, including role passing and persistence services. Role information is not passed to the container until after a session has been established. Role-based authorization is performed by the role passing and persistence mechanism, which is discussed in detail below.

Role-Based Access Control

Some or all services 106, 108, 109 may be access controlled such that a requesting client is required to have one or more access privileges. In one embodiment, container 102 stores access control information 120. In one embodiment, access control information 120 is maintained in terms of a hierarchy of users, roles, and privileges. Users are at the top of the hierarchy. A user can have one or more roles. A role may be, for example, "employee", "manager", etc. If a user is a low level employee, then he may have just the "employee" role. If a user is a manager, then he may have both the "manager" and "employee" roles. Each role may have one or more associated privileges. A privilege provides permission to access some information or to perform some function. Different roles may have different privileges. For example, while a "manager" role may have a privilege "X" that allows financial information to be viewed, an "employee" role may not have such a privilege.

In one embodiment, information pertaining to the users, roles, and privileges are stored in data structures 122, 124, and 126. Specifically, data structure 126 stores all of the available privileges. Data structure 124 stores the mapping between roles and privileges. Thus, if the "manager" role has the privileges "X" and "Y", then that would be specified in this data structure 124. Data structure 122 stores the mapping between users and roles. Hence, if a user has the "manager" and "employee" roles, then that would be specified in this data structure 122. For purposes of the present invention, data structures 122, 124, and 126 may be any type of data structure taking on any desired form. In one embodiment, the data structures 122, 124, and 126 take the form of extensible markup language (XML) documents. More specifically, the information contained in data structures 122, 124, 126 is specified using extensible access control markup language (XACML), which is a form of XML. XACML is a well known standard; hence, it need not be described in detail herein.

In one embodiment, while services 106, 108, 109 are responsible for knowing which, if any, privileges are required to invoke that service, the service is not responsible for determining what privileges are associated with a client making a request. Rather, as will be discussed further below, a service 106, 108, 109 communicates with role passing and persistence mechanism 110 to find out what privileges are associated with a client session through which a request for its service is received.

Role Passing and Persistence Mechanism

As noted above, container 102 exposes the functionalities provided by services 106, 108, 109 through adaptors 150, 152, 154 so that they can be invoked by clients 140, 142, 144. When a client wants to invoke a functionality of a service hosted by the container, the client connects to the adaptor of the container that supports a network protocol used by the client, and establishes a client session with the container.

The adaptor authenticates the client by enlisting the services of an authentication module. After authentication, but before invoking the requested service, the role passing and persistence mechanism 110 is invoked by the client to validate and persist any roles associated with the client. That is, instead of passing role information to the adaptor when establishing the connection, a client passes its role information through a remote API call to the container through the established session, bypassing the adaptor.

In particular, role validating module 112 of role passing and persistence mechanism 110 is called with role information being passed as one or more arguments in call to ensure that they are valid. The role validating module 112 checks the validity of passed role information to ensure that any identified roles are valid (i.e., the role exists), and may also determine if the user-role association is valid. The role passing mechanism 110 has access to all access control information 120 stored by container 102 in order to make queries, etc. The role passing mechanism may communicate 195 the results of its role validity checks to client 140.

Figure 1B:
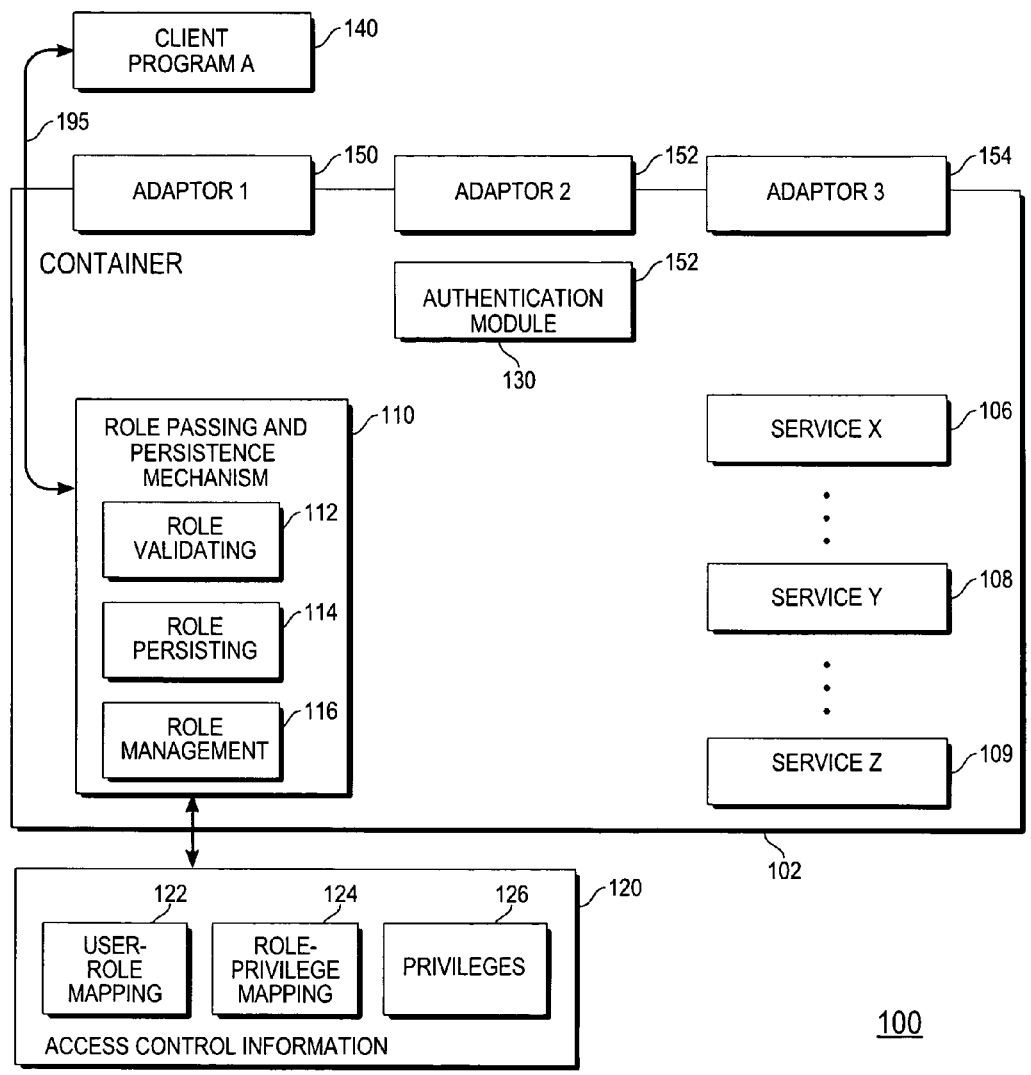

The example embodiment shown in FIGS. 1A and 1B illustrate this concept. As shown in FIG. 1A, Client Program A (140) communicates 180 with Adaptor 1 to initiate a session. Adaptor 1 invokes 190 authentication module 130 to authenticate the client, and a session ID that uniquely identifies the client session is created and returned to client 140. Then, as shown in FIG. 1B, after authentication, client 140 invokes 195 role passing and persistence mechanism 110 to validate any roles associated with it. The role validating module 112 of role passing and persistence mechanism 110 receives role information from client 140 as parameters in the call to the API.

In addition to performing the role validating function, role passing and persistence mechanism 110 also includes a role persisting module 114. This module is used to persist any roles associated with a session such that any service hosted y the container can later communicate with the role passing and persistence mechanism to find out what roles are associated with a client session. The role passing and persistence mechanism receives role information from any type of client, and persists the role information for the duration of the client session. In one embodiment, to persist a role for a session identified by the session ID, the role persisting module simply stores session IDs with one or more role names associated with each session M. Access control information 120 can be used to determine privileges associated with the stored role name when needed.

This is shown in FIGS. 1A-1B. After role validation, client 140 invokes role passing and persistence mechanism 110 again to persist the roles. The role persisting module 114 of role passing and persistence mechanism 110 persists the role information for the session ID. In alternative embodiments, role validating and persisting are both performed through a single API call that passes in the session ID and role information as arguments.

Once role information is persisted, any service invoked by the client during that session can use the persisted information associated with the unique session ID to determine whether to allow the client to access its functionality. For example, if a client attempts to invoke Service Y on an established session, service Y calls the role passing and persistence mechanism to obtain role information for that session. In one embodiment, Service Y will then call the role passing and persistence mechanism again to determine whether the determined role has the required privileges to access the service. In alternative embodiments, a single call is made to perform both functions. If the determined role indicates that the client has sufficient privileges to access Service Y, then Service Y returns the requested information to the client.

Figure 1C:
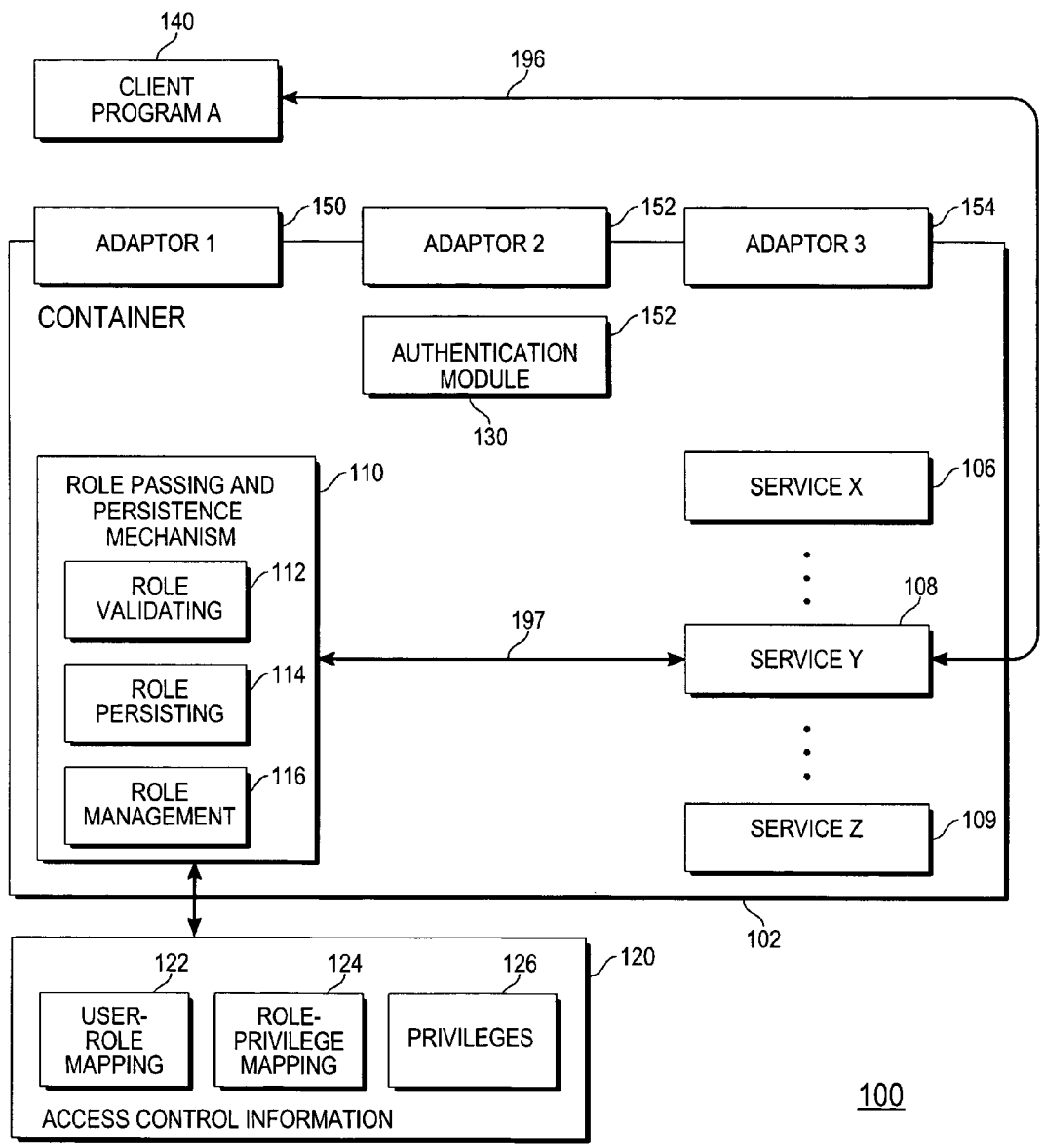

For example, consider the example embodiment shown in FIG. 1C. At this point, client 140 has been authenticated (FIG. 1A), and its role has been validated and persisted (FIG. 1B). As shown in FIG. 1C, when client 140 attempts to invoke Service Y (108), Service Y communicates 197 with role passing mechanism 110 to see what roles are associated with client 140. Role passing and persistence mechanism 110 makes the determination and reports back to the requesting service.

The role passing and persistence mechanism performs these functions for any authenticated client 140, 142, 144 that establishes a session with the container 102. Thus, the adaptors 150, 152, 154 do not need to receive, process or pass any role-based access control information. Once a session is established, the adaptor is no longer involved, and role information is passed to the role passing and persistence mechanism independent of any protocol supported by any individual adaptor. In addition, the role passing and persistence mechanism 110 eliminates the need for the container 102 to include programming logic to handle role passing information for each adaptor. Rather, when a service hosted by the container needs to obtain role-based access control information associated with a request, it can call upon the role passing and persistence mechanism 110. Thus, the role passing and persistence mechanism 110 provides role-based access control functionality for all of the hosted services 106, 108, 109 at the container level.

Persisted role information can also be used to provide auditing functions. The persisted role information can associate particular operations with the users that initiated the operations, and keep track of which users have accessed which services.

In addition, role passing and persistence mechanism 110 includes a role management module 116. This module is used to perform administrative functions relating to RBAC, such as changing user/role associations, creating/deleting a user, creating/deleting a role, changing role/privilege associations, etc. For example, after establishing a session with the container, an application can create a role with certain privileges before attempting to invoke a service hosted by the container that requires those privileges. Role management module 116 also enables clients and other external entities to modify access control information 120 stored by the container. Because the role passing mechanism 110 can perform these role management functions "on-the-fly", a user is not required to shut down a connection and re-open a connection to the container when his role changes.

For example, consider FIG. 1B. Client 140 can invoke role passing and persistence mechanism with a call 195 to a "SetSessionRole" function. This function takes as parameters the session ID and a role name. The role passing and persistence mechanism sets the role for the session identified by the session ID to the named role for all future requests coming from that session. The role is changed without closing the session and re-opening a new connection.

Example Implementation

In one embodiment, the role passing and persistence mechanism 110 is implemented as a service within the container 102. Thus, as with every other service hosted by the container 102, the role passing and persistence mechanism 110 exposes the functionalities that it provides through container 102, and the other services 106, 108, 109 in the container 102 are able to invoke role passing and persistence mechanism functionalities. In addition, the role passing and persistence mechanism functionalities may be invoked by external clients. To clearly distinguish the functionalities provided by the role passing and persistence mechanism 110 from the functionalities provided by the other services, the functionalities provided by the role passing and persistence mechanism 110 will hereinafter be referred to as the RBAC services.

In one embodiment, a common remote Application Programming Interface (API) approach is used to pass role information using the connection established by an adaptor. The role passing and persistence mechanism implements the API with functions that validate and persist roles for the session established by the connection, as well as functions used by hosted services to enforce RBAC for requests received through the established session.

In one embodiment, the role passing and persistence mechanism 110 provides the following functions:
hasHssRole—determines whether or not the user has the given role;
getHssRole—gets an array of the names of the roles the user is authorized to have;
getHssActivities—returns the names of the activities a role is authorized to perform;
addActionToActivities—adds named action to the named activities;
addActivityToRole—adds the named activity to the named role;
addActivity—adds new named activity;
addRoleToUser—adds named role to the identified user;
createRole—creates named role;
createUser—create named user;
getActivities—get all activities a user is authorized to person;
getSessionRole—returns the client role;
isAuthorized—determines whether or not a user is authorized to perform an activity;
isAuthorizedRole—determines whether or not the role is authorized for the user;
removeActionFromActivity—removes named action from named activity;
removeActivity—removes named activity;
removeActivityFromRole—removes named activity from named role;
removeRoleFromUser—removes named role from identified user;
removeRole—removes named role;
removeUser—removes identified user;

These functions typically take session identifiers, role names, user identifiers, etc., as parameters to perform the named functions. The above example function titles incorporate the term "activity" instead of the term "privilege", however, those skilled in the art will recognize that any terminology can be used.

It should be noted that this list of RBAC services is shown for illustrative purposes only. It is not meant to be definitive or exhaustive. Thus, the role passing and persistence mechanism 110 may provide fewer services, more services, and/or different services.

Sample Operation

With reference to the functional block diagrams of FIGS. 1A-1C and the operational flow diagram of FIG. 2, a sample operation of the system 100 will now be described using the example of Client Program A making a request for Service Y from container 102.

Figure 2:
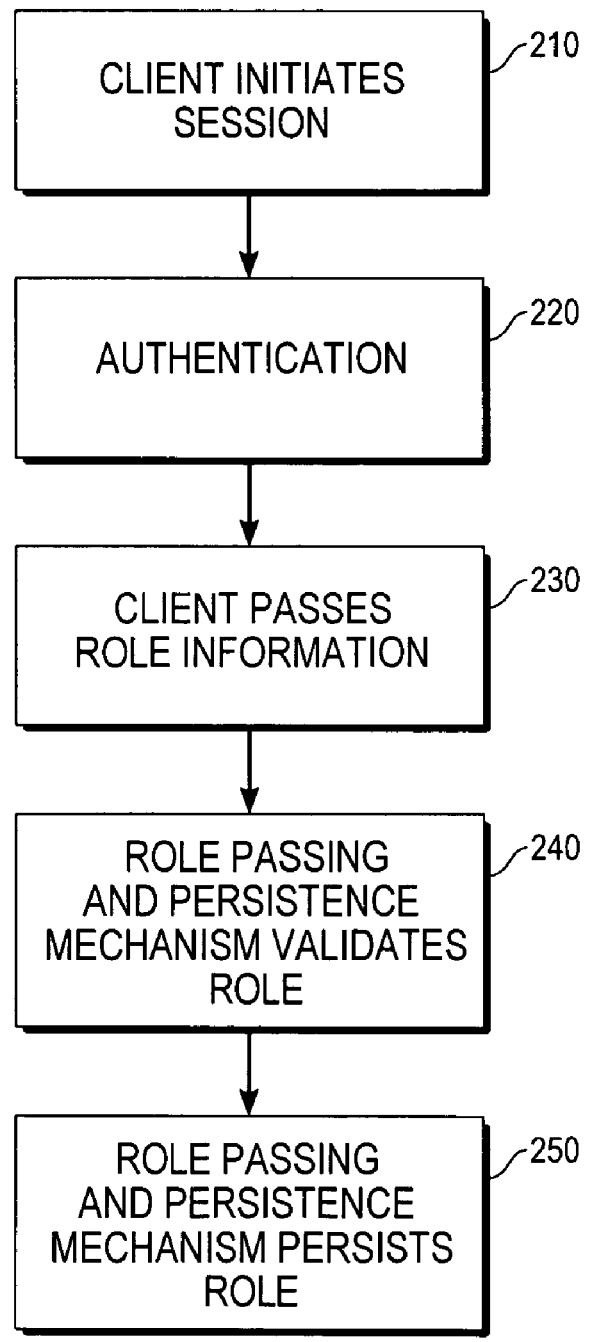
FIG. 2 is an operational flow diagram illustrating the operation of a role passing and persistence mechanism, in accordance with one embodiment of the present invention.

In the process shown in FIG. 2, a client initiates a session with container 102 at step 210. This is illustrated in FIG. 1A as connection request 180 from Client Program A (140) to Adaptor 1 (150). This connection request contains a User ID and password. In one embodiment, the User ID and password are provided by the adaptor to an authentication module in the container. This is illustrated in FIG. 1A as authentication call 190 from Adapter 1 (150) to authentication module 130. In alternative embodiments, authentication functions provided by an operating system may be used instead.

At step 220, the user associated with the client is authenticated by authentication module 130. Authentication module 130 returns the result of the authentication process, and if the user is authenticated, a session ID is created and is assigned to the session. The Adaptor returns the session ID to the requesting client, and, in one embodiment, also sends a list of services hosted by the container to the client. In another embodiment, the client must make a separate request to the container to obtain a list of hosted services.

The client creates an instance of the RBAC services provided by the role passing and persistence mechanism, and makes API calls to RBAC services functions to pass role information to the container. Role information is passed as a parameter in an API call at step 230. Significantly the client must invoke role passing and persistence mechanism functions to validate and persist role information before attempting to invoke other services hosted by the container.

The role passing and persistence mechanism checks the validity of passed role information at step 240 through role validating module 112. If valid, the role passing and persistence mechanism persists the passed role information for the session through role persisting module 114 at step 250. In one embodiment, these functions are performed through separate calls; alternatively, a single API call may be made to perform both functions.

After a session is established, and role information is persisted for that session, other services hosted by the container can call role passing and persistence mechanism to obtain role information for a session by passing a session ID in the API call.

Hardware Overview

Figure 3:
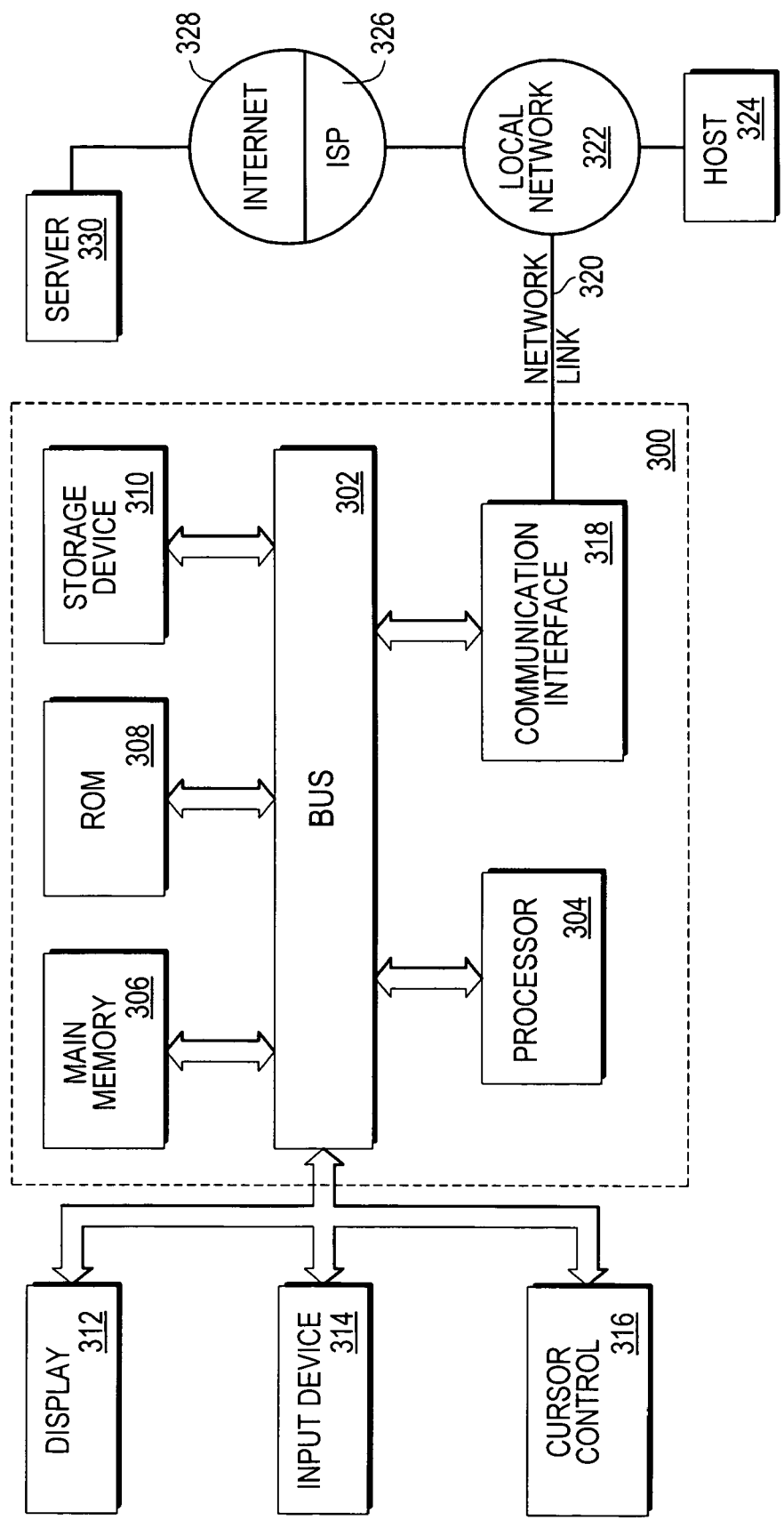
FIG. 3 is a block diagram of a general purpose computer system in which one embodiment of the present invention may be implemented.

In one embodiment, the functional components (e.g. container 102, services 104, 106, 109, authentication module 130, role passing and persistence mechanism 110, adaptors 150, 152, 154, etc.) shown in FIGS. 1A-1C are implemented as one or more sets of instructions executed on one or more computer systems. FIG. 3 is a block diagram of a sample computer system 300 on which one or more of the functional components may be implemented. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, signals, data, etc., to be exchanged between the various components. For example, bus 302 may be a set of conductors that carries electrical signals. Bus 302 may also be a wireless medium (e.g. air) that carries wireless signals between one or more of the components. Bus 302 may also be a medium (e.g. air) that enables signals to be capacitively exchanged between one or more of the components. Bus 302 may further be a network connection that connects one or more of the components. Overall, any mechanism and/or medium that enables information, signals, data, etc., to be exchanged between the various components may be used as bus 302.

Bus 302 may also be a combination of these mechanisms/media. For example, processor 304 may communicate with storage device 310 wirelessly. In such a case, the bus 302, from the standpoint of processor 304 and storage device 310, would be a wireless medium, such as air. Further, processor 304 may communicate with ROM 308 capacitively. In this instance, the bus 302 would be the medium (such as air) that enables this capacitive communication to take place. Further, processor 304 may communicate with main memory 306 via a network connection. In this case, the bus 302 would be the network connection. Further, processor 304 may communicate with display 312 via a set of conductors. In this instance, the bus 302 would be the set of conductors. Thus, depending upon how the various components communicate with each other, bus 302 may take on different forms. Bus 302, as shown in FIG. 3, functionally represents all of the mechanisms and/or media that enable information, signals, data, etc., to be exchanged between the various components.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A computer-implemented method, comprising:

calling, by a first adaptor of a plurality of adaptors of a web server, an authentication function of the web server to authenticate a first user identification and password information, wherein the web server supports a plurality of connection protocols and the first adaptor implements a first connection protocol of the plurality of connection protocols;

interacting, by the first adaptor using the first connection protocol, with a first client to establish a first session in response to a first successful authentication, wherein the first client implements the first connection protocol;

receiving, by a role persistence mechanism of the web server after establishing the first session, a first request comprising first role information directly from the first client via a first application programming interface (API) call without using any of the plurality of connection protocols supported by the plurality of adaptors,
   wherein the first client bypasses the first adaptor when transmitting the first request to the role persistence mechanism,
   wherein the first role information identifies a first set of one or more roles of the first client, and
   wherein the first request is the first passing of any role information between the first client and the web server for the first session;

using, by the role persistence mechanism in response to the first request, the first role information to associate the first set of one or more roles with the first session in a persistent manner;

calling, by a second adaptor of the plurality of adaptors, the authentication function of the web server to authenticate a second user identification and password information, wherein the second adaptor implements a second connection protocol of the plurality of connection protocols which is different from the first connection protocol;

interacting, by the second adaptor using the second connection protocol, with a second client to establish a second session in response to a second successful authentication, wherein the second client implements the second connection protocol;

receiving, by the role persistence mechanism, a second request comprising second role information directly from the second client via a second API call without using any of the plurality of connection protocols supported by the plurality of adaptors, wherein the second client bypasses the second adaptor when transmitting the second request to the role persistence mechanism;

using, by the role persistence mechanism in response to the second request, the second role information to associate a second set of one or more roles with the second session in the persistent manner;

receiving, by a hosted service of the web server, a service request for the hosted service from the first client;

providing, by the role persistence mechanism of the web server, the first role information to the hosted service;

in response to determining that the first client has privileges to access the hosted service based on the first role information, providing the hosted service to the first client;

receiving, by the role persistence mechanism, a third request comprising third role information directly from the first client via a third API call without using any of the plurality of connection protocols supported by the plurality of adaptors,
   wherein the first client bypasses the first adaptor when transmitting the third request to the role persistence mechanism, and wherein the third request is to change the first set of one or more roles of the first client to a third set of one or more roles of the first client and using, by the role persistence mechanism in response to the third request, the third role information to associate the third set of one or more roles with the first session in the persistent manner, wherein, after the third set of one or more roles is associated with the first session, at least one hosted service uses the third role information to determine whether the first client has privileges to access the at least one hosted service during the first session.

2. The method of claim 1, wherein the first request from the first client comprises a session identifier associated with the first session and the first session and the first set of one or more roles.

3. The method of claim 1, wherein associating comprises: validating that the first set of one or more roles is allowed to be associated with the first session.

4. The method of claim 3, wherein the first request from the first client comprises role-user associated information, and wherein validating comprises:
validating a role in the first set of one or more roles; and
validating the role-user association information.

5. The method of claim 1, wherein the first API call is received by the role persistence mechanism from the first client and not from the first adaptor.

6. A computer-implemented method, comprising:
calling, using a first adaptor of a plurality of adaptors of a web server, an authentication function of the web server to authenticate a first user identification and password information, wherein the web server supports a plurality of connection protocols and the first adaptor implements a first connection protocol of the plurality of connection protocols;
interacting with the first adaptor using the first connection protocol to establish a first session in response to a first successful authentication;
receiving a first session identifier that uniquely identifies the first session to the web server;
after receiving the first session identifier, sending, by a client, a first request comprising first role information directly to a role persistence mechanism of the web server via a first application programming interface (API) call without using any of the plurality of connection protocols supported by the plurality of adaptors,
wherein the first adaptor is bypassed when transmitting the first request to the role persistence mechanism,
wherein the first role information identifies a first set of one or more roles of the first client, and
wherein the first request is the first passing of any role information between the client and the web server for the first session;
requesting, through the first session, a first service hosted by the web server, wherein the web server provides the first service if the first set of one or more roles associated with the first session has sufficient privileges to access the service;
after requesting, through the first session, the first service hosted by the webserver, sending a second request comprising second role information directly to the role persistence mechanism of the webserver via a second API call without using any of the plurality of connection protocols supported by plurality of adaptors,
wherein the first adaptor is bypassed when transmitting the second request to the role persistence mechanism, and
wherein second request is to change the first set of one or more roles of the client to a third set of one or more roles of the client; and
requesting, through the first session, a second service hosted by the web server, wherein the web server provides the second service if the second set of one or more roles associated with the first session has sufficient privileges to access the service.

7. A non-transitory machine readable storage medium comprising instructions which, when executed by one or more processors, cause the one or more processors to implement the operations of:
calling, using a first adaptor of a plurality of adaptors of a web server, an authentication function of the web server to authenticate a first user identification and password information, wherein the web server supports a plurality of connection protocols and the first adaptor implements a first connection protocol of the plurality of connection protocols;
interacting with the first adaptor using the first connection protocol to establish a first session in response to a first successful authentication;
receiving a first session identifier that uniquely identifies the first session to the web server;
after receiving the first session identifier, sending, by a client, a first request comprising first role information directly to the a role persistence mechanism of the web server via a first application programming interface (API) call without using any of the plurality of connection protocols supported by the plurality of adaptors,
wherein the first adaptor is bypassed when transmitting the first request to the role persistence mechanism,
wherein the first role information identifies a first set of one or more roles of the first client, and
wherein the first request is the first passing of any role information between the client and the web server for the first session;
requesting, through the first session, a first service hosted by the web server, wherein the web server provides the first service if the first set of one or more roles associated with the first session has sufficient privileges to access the service;
after requesting, through the first session, the first service hosted by the webserver, sending a second request comprising second role information directly to the role persistence mechanism of the webserver via a second API call without using any of the plurality of connection protocols supported by the plurality of adaptors,
wherein the first adaptor is bypassed when transmitting the second request to the role persistence mechanism, and
wherein second request is to change the first set of one or more roles of the client to a third set of one or more roles of the client; and
requesting, through the first session, a second service hosted by the web server, wherein the web server provides the second service if the second set of one or more roles associated with the first session has sufficient privileges to access the service.

8. A computer system comprising:
memory comprising executable software instructions; and
one or more processors configured to execute the software instructions to implement:
a web server for hosting one or more services, wherein the web server supports a plurality of connection protocols;

a first adaptor container comprising a first adaptor of a plurality of adaptors within the web server, wherein the first adaptor implements a first connection protocol of the plurality of connection protocols;

a second adaptor container comprising a second adaptor of the plurality of adaptors within the web server, wherein the second adaptor implements a second connection protocol of the plurality of connection protocols; and a role persistence mechanism container comprising a role persistence mechanism within the web server;

wherein the first adaptor calls an authentication function of the web server to authenticate a first user identification and password information using the first connection protocol;

wherein the first adaptor interacts with a first client to establish a first session in response to a first successful authentication, the first client implementing the first connection protocol;

wherein the role persistence mechanism receives, after establishing the first session, a first request comprising first role information directly from the first client via a first application programming interface (API) call without using any of the plurality of connection protocols supported by the plurality of adaptors, wherein the first client bypasses the first adaptor when transmitting the first request to the role persistence mechanism, wherein the first role information identifies a first set of one or more roles of the first client, and wherein the first request is the first passing of any role information between the first client and the web server for the first session;

wherein the role persistence mechanism, in response to the request, uses the first role information to associate the first set of one or more roles with the first session in a persistent manner;

wherein the second adaptor calls the authentication function of the web server to authenticate a second user identification and password information using the second connection protocol;

wherein the second adaptor interacts with a second client to establish a second session in response to a second successful authentication, the second client implementing the second connection protocol;

wherein the role persistence mechanism receives a second request comprising second role information directly from the second client via a second API call without using any of the plurality of connection protocols supported by the plurality of adaptors, wherein the second client bypasses the second adaptor when transmitting the second request to the role persistence mechanism;

wherein the role persistence mechanism, in response to the request, associates the set of one or more roles with the second session in the persistent manner;

wherein a hosted server of the web server receives a service request for a hosted service of the one or more services from the first client;

wherein the role persistence mechanism provides the first role information to the hosted service;

wherein, in response to determining that the first client has privileges to access the hosted service based on the first role information, the hosted service is provided to the first client;

wherein the role persistence mechanism receives a third request comprising third role information directly from the first client via a third API call without using any of the plurality of connection protocols supported by the plurality of adaptors, wherein the first client bypasses the first adaptor when transmitting the third request to the role persistence mechanism, and wherein the third request is to change the first set of one or more roles of the first client to a third set of one or more roles of the first client;

wherein the role persistence mechanism in response to the third request uses the third role information to associate the third set of one or more roles with the first session in the persistent manner; and wherein, after the third set of one or more roles is associated with the first session, at least one hosted service uses the third role information to determine whether the first client has privileges to access the at least one hosted service during the first session.

9. The computer system of claim 8, wherein the role persistence mechanism is a service hosted by the web server.

10. A non-transitory machine readable storage medium comprising instructions which, when executed by one or more processors, cause the one or more processors to perform the operations of:

calling, by a first adaptor of a plurality of adaptors of a web server, an authentication function of the web server to authenticate a first user identification and password information, wherein the web server supports a plurality of connection protocols and the first adaptor implements a first connection protocol of the plurality of connection protocols;

interacting, by the first adaptor using the first connection protocol, with a first client to establish a first session in response to a first successful authentication, wherein the first client implements the first connection protocol of the plurality of connection protocols;

receiving, by a role persistence mechanism of the web server after establishing the first session, a first request comprising first role information directly from the first client via a first application programming interface (API) call without using any of the plurality of connection protocols supported by the plurality of adaptors, wherein the first client bypasses the first adaptor when transmitting the first request to the role persistence mechanism, wherein the first role information identifies a first set of one or more roles of the first client, and wherein the first request is the first passing of any role information between the first client and the web server for the first session;

using, by the role persistence mechanism in response to the first request, the first role information to associate the first set of one or more roles with the first session in a persistent manner;

calling, by a second adaptor of the plurality of adaptors, the authentication function of the web server to authenticate a second user identification and password information, wherein the second adaptor implements a second connection protocol of the plurality of connection protocols which is different from the first connection protocol;

interacting, by the second adaptor using the second connection protocol, with a second client to establish a second session in response to a second successful authentication, wherein the second client implements the second connection;

receiving, by the role persistence mechanism, a second request comprising second role information directly from the second client via a second API call without using any of the plurality of connection protocols supported by the plurality of adaptors, wherein the second client bypasses the second adaptor when transmitting the second request to the role persistence mechanism;

using, by the role persistence mechanism in response to the second request, the second role information to associate a second set of one or more roles with the second session in the persistent manner;

receiving, by a hosted service of the web server, a service request for the hosted service from the first client;

providing, by the role persistence mechanism of the web server, the first role information to the hosted service;

in response to determining that the first client has privileges to access the hosted service based on the first role information, providing the hosted service to the first client;

receiving, by the role persistence mechanism, a third request comprising third role information directly from the first client via a third API call without using any of the plurality of connection protocols supported by the plurality of adaptors, wherein the first client bypasses the first adaptor when transmitting the third request to the role persistence mechanism, wherein the third request is to change the first set of one or more roles of the first client to a third set of one or more roles of the first client and using, by the role persistence mechanism in response to the third request, the third role information to associate the third set of one or more roles with the first session in the persistent manner, wherein, after the third set of one or more roles is associated with the first session, at least one hosted service uses the third role information to determine whether the first client has privileges to access the at least one hosted service during the first session.

11. The non-transitory machine readable storage medium of claim 10, wherein the first request from the first client comprises a session identifier associated with the first session and the first set of one or more roles.

12. The non-transitory machine readable storage medium of claim 10, wherein associating comprises:

validating that the first set of one or more roles is allowed to be associated with the first session.

13. The non-transitory machine readable storage medium of claim 12, wherein the first request from the first client comprises role-user association information, and wherein validating comprises:

validating a role in the first set of one or more roles; and validating the role-user association information.

14. The non-transitory machine readable storage medium of claim 10, wherein the first API call is received by the role persistence mechanism from the first client and not from the first adaptor.

* * * * *